United States Patent
Tsuchiya et al.

(10) Patent No.: US 11,632,068 B2
(45) Date of Patent: Apr. 18, 2023

(54) MOTOR DRIVING DEVICE AND AIR CONDITIONER

(71) Applicant: Mitsubishi Electric Corporation, Tokyo (JP)

(72) Inventors: Atsushi Tsuchiya, Tokyo (JP); Kazunori Hatakeyama, Tokyo (JP); Shinya Toyodome, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 80 days.

(21) Appl. No.: 17/435,226

(22) PCT Filed: Mar. 6, 2019

(86) PCT No.: PCT/JP2019/008831
§ 371 (c)(1),
(2) Date: Aug. 31, 2021

(87) PCT Pub. No.: WO2020/179008
PCT Pub. Date: Sep. 10, 2020

(65) Prior Publication Data
US 2022/0060133 A1    Feb. 24, 2022

(51) Int. Cl.
*H02P 25/18* (2006.01)
*H02P 6/10* (2006.01)
(Continued)

(52) U.S. Cl.
CPC ............. *H02P 25/18* (2013.01); *H02P 6/10* (2013.01); *H02P 27/08* (2013.01); *H02P 29/024* (2013.01); *H02P 2207/05* (2013.01)

(58) Field of Classification Search
CPC ........ H02P 25/18; H02P 27/08; H02P 29/024; H02P 6/10; H02P 2207/05
See application file for complete search history.

(56) References Cited

U.S. PATENT DOCUMENTS

| 9,746,216 B2 * | 8/2017 | Yamakawa | ............. | F25B 30/02 |
| 11,018,615 B2 * | 5/2021 | Tokuda | .................. | H02P 27/08 |

(Continued)

FOREIGN PATENT DOCUMENTS

| JP | 2006-033954 A | 2/2006 |
| JP | 2008-228513 A | 9/2008 |

(Continued)

OTHER PUBLICATIONS

International Search Report dated Jun. 11, 2019, issued in corresponding International Application No. PCT/JP2019/008831 (and English Machine Translation).

*Primary Examiner* — Thai T Dinh
(74) *Attorney, Agent, or Firm* — Posz Law Group, PLC

(57) ABSTRACT

A motor driving device includes: a connection switcher that has an electromagnetic contactor connected to a winding of a motor and switches connection condition of the winding by switching condition of the electromagnetic contactor; an inverter to apply an output voltage as an AC voltage to the winding via the connection switcher; a short-circuiting circuit having a rectification circuit and a switch; and a controller to control the electromagnetic contactor, the inverter and the switch, wherein a circulating circuit is formed by the short-circuiting circuit and the winding when the switch is set at ON, and the connection switcher switches the connection condition of the winding in a period in which the output voltage of the inverter is set at zero in a rotating operation of the motor and a current caused by the rotating operation circulates in the circulating circuit.

11 Claims, 15 Drawing Sheets

(51) Int. Cl.
    *H02P 27/08*     (2006.01)
    *H02P 29/024*     (2016.01)

(56) References Cited

U.S. PATENT DOCUMENTS

| | | | |
|---|---|---|---|
| 11,070,161 B2 * | 7/2021 | Hatakeyama | F25B 31/02 |
| 2020/0186072 A1 * | 6/2020 | Shimada | H02P 25/184 |

FOREIGN PATENT DOCUMENTS

| | | | | |
|---|---|---|---|---|
| JP | 2013-062888 A | 4/2013 | | |
| WO | WO-2018163363 A1 * | 9/2018 | | F25B 31/02 |

\* cited by examiner

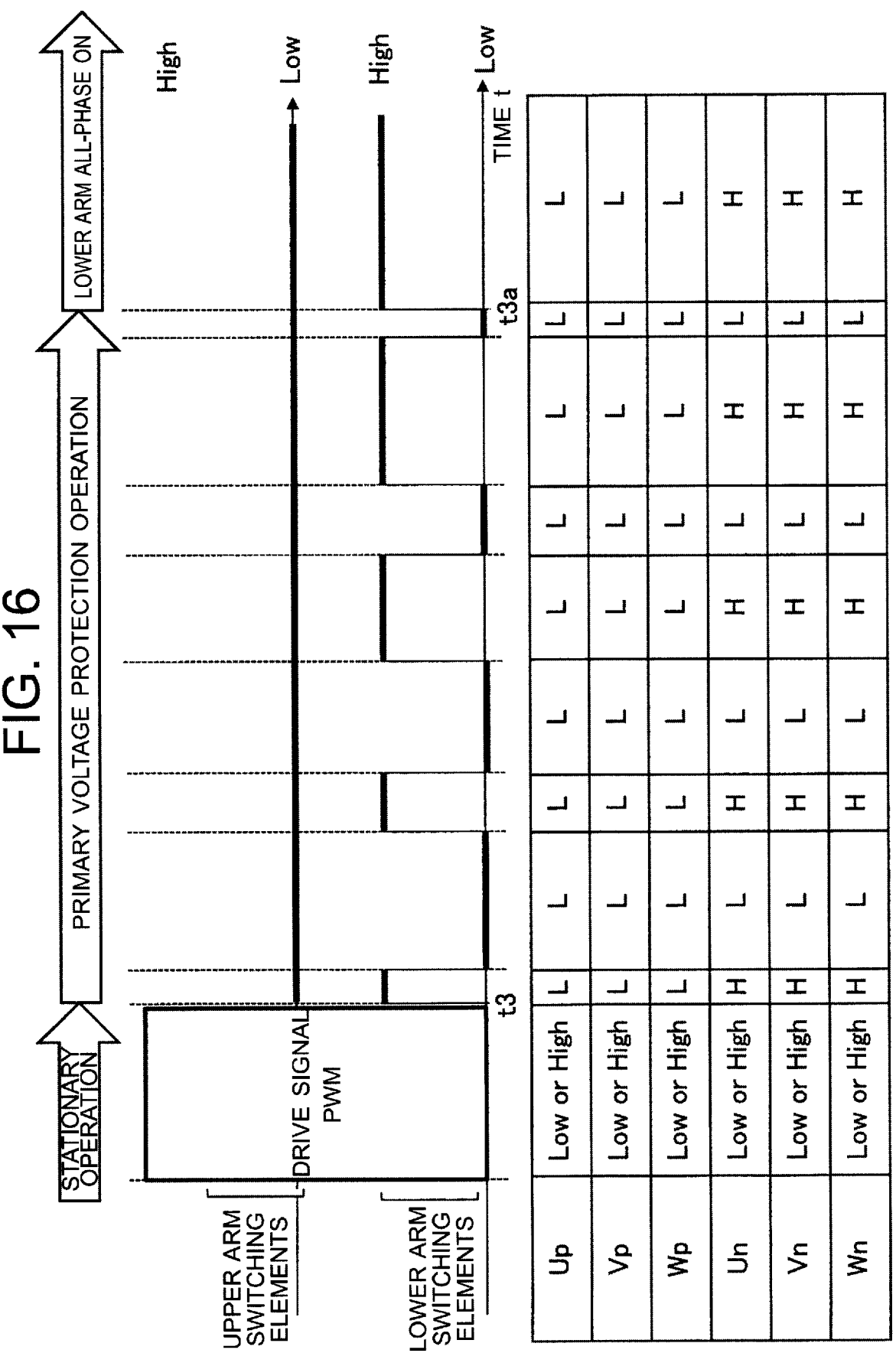

MOTOR DRIVING DEVICE AND AIR CONDITIONER

CROSS REFERENCE TO RELATED APPLICATION

This application is a U.S. national stage application of International Patent Application No. PCT/JP2019/008831 filed on Mar. 6, 2019, the disclosure of which is incorporated herein by reference.

TECHNICAL FIELD

The present invention relates to a motor driving device and an air conditioner.

BACKGROUND

Air conditioners that switch the connection condition of a stator winding of a motor for driving a compressor depending on indoor environment are widespread. Further, there has been proposed a technology for performing the switching of the connection condition of a motor in the middle of the rotating operation of the motor. For example, Patent Reference 1 proposes a method of switching the connection condition of the winding by performing a switching operation of switches forming a connection switcher in a period in which an output voltage of an inverter is controlled so that the current flowing from the inverter to the motor equals zero in the rotating operation of the motor.

PATENT REFERENCE

Patent Reference 1: Japanese Patent Application Publication No. 2013-62888

However, in the method described in the Patent Reference 1, at the time of the switching operation performed by the connection switcher, a potential difference corresponding to line-to-line voltage of the inverter occurs between contact points of the switch and arc discharge occurs between the contact points. Thus, there is a problem in that failure due to the wear, fusion or the like of the contact points is likely to occur in the connection switcher.

SUMMARY

An object of the present invention, which has been made to resolve the above-described problem with the conventional technology, is to provide a motor driving device in which no failure occurs in the connection switcher even if the switching of the connection condition is performed in the middle of the rotating operation of the motor, and an air conditioner including the motor driving device.

A motor driving device according to an aspect of the present invention includes a connection switcher that has an electromagnetic contactor connected to a winding of a motor and switches connection condition of the winding by switching condition of the electromagnetic contactor; an inverter to apply an output voltage as an AC voltage to the winding via the connection switcher; a short-circuiting circuit having a rectification circuit and a switch; and a to control the electromagnetic contactor, the inverter and the switch. A circulating circuit is famed by the short-circuiting circuit and the winding when the switch is set at ON. The connection switcher switches the connection condition of the winding in a period in which the output voltage of the inverter is set at zero in a rotating operation of the motor and a current caused by the rotating operation circulates in the circulating circuit.

An air conditioner according to another aspect of the present invention includes a motor and the above-described motor driving device that drives the motor.

According to the present invention, an advantage is obtained in that no failure occurs in the connection switcher even if the switching of the connection condition is performed in the middle of the rotating operation of the motor.

BRIEF DESCRIPTION OF THE DRAWINGS

FIG. 16 is a diagram showing an example of a primary voltage protection operation that is provided between a stationary operation state of the inverter and an all-phase ON state of the lower arm.

DETAILED DESCRIPTION

A motor driving device and an air conditioner according to an embodiment of the present invention will be described below with reference to the drawings. The following embodiment is just an example and a variety of modifications are possible within the scope of the present invention.

(1) Air Conditioner

Figure 1:
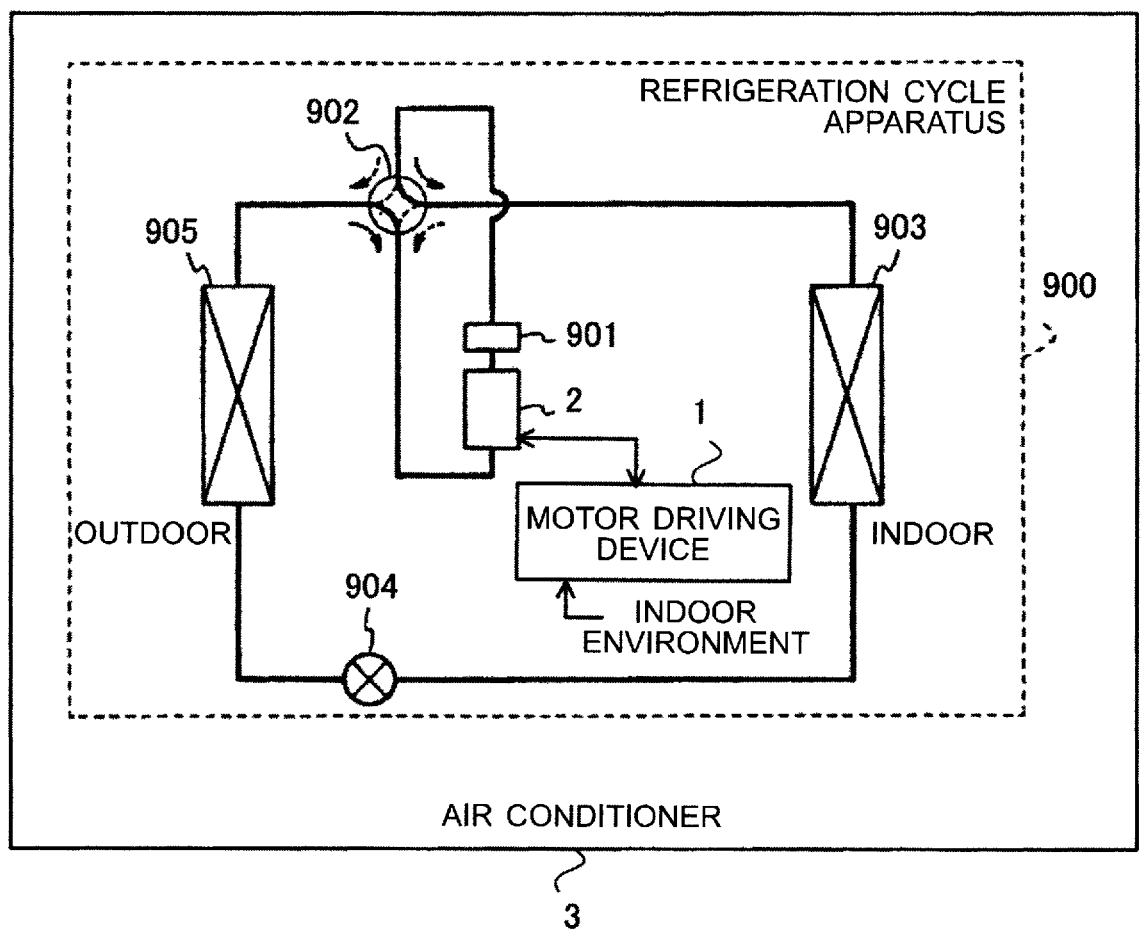
FIG. 1 is a schematic diagram showing an example of a configuration of an air conditioner according to an embodiment of the present invention.

FIG. 1 is a schematic diagram showing an example of a configuration of an air conditioner 3 according to an embodiment of the present invention. As shown in FIG. 1, the air conditioner 3 includes a compressor 901 that compresses a refrigerant, a four-way valve 902, an indoor heat exchanger 903, an expansion valve 904 that decompresses and expands the refrigerant, an outdoor heat exchanger 905, a motor 2 that drives the compressor 901, and a motor driving device 1 that drives the motor 2. These components constitute a refrigeration cycle apparatus 900. The air conditioner 3 is capable of performing a heating operation or a cooling operation by the switching of the four-way valve 902.

In the heating operation, the refrigerant is compressed and sent out by the compressor 901, flows through the four-way valve 902 in a direction indicated by a solid line arrow, and returns to the compressor 901 through the indoor heat exchanger 903, the expansion valve 904, the outdoor heat exchanger 905 and the four-way valve 902. In the heating operation, the indoor heat exchanger 903 operates as a condenser and releases heat so as to consecutively heat the inside of a room, while the outdoor heat exchanger 905 operates as an evaporator and absorbs heat.

In the cooling operation, the refrigerant is compressed and sent out by the compressor 901, flows through the four-way valve 902 in a direction indicated by a broken line arrow, and returns to the compressor 901 through the outdoor heat exchanger 905, the expansion valve 904, the indoor heat exchanger 903 and the four-way valve 902. In the cooling operation, the outdoor heat exchanger 905 operates as a condenser and releases heat, while the indoor heat exchanger 903 operates as an evaporator and absorbs heat so as to consecutively cool the inside of the room.

The motor driving device 1 performs variable-speed control on the motor 2 based on information from the outside including an indoor temperature and a set temperature (referred to also as an "indoor environment"). Further, the motor driving device 1 switches the connection condition of the motor 2 based on the indoor environment. In this embodiment, the motor driving device 1 switches the connection condition in the middle of the rotating operation of the motor 2. In this embodiment, a description will be given of an example in which the connection condition is switched between star connection (i.e., Y connection) and delta connection (i.e., Δ connection). However, the switching of the connection condition is not limited to the switching between the Y connection and the Δ connection. For example, the switching of the connection condition can be switching of the number of turns of the winding.

Incidentally, while the motor driving device 1 according to this embodiment is used for driving the motor 2 for the compressor, the motor driving device 1 may also be used for driving a motor for a different purpose such as a motor for a blower fan.

(2) Motor Driving Device

(2-1) Configuration

Figure 2:
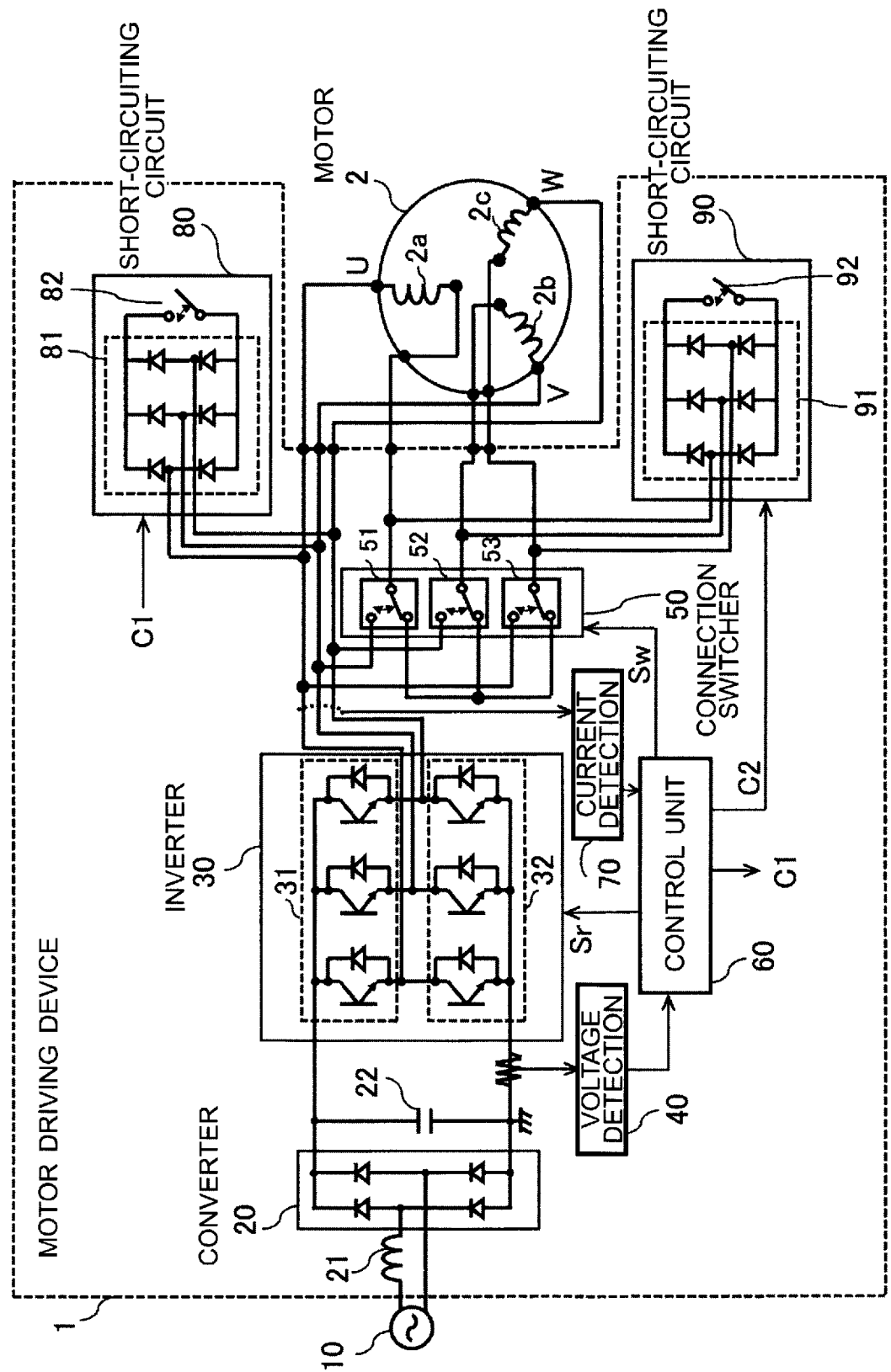
FIG. 2 is a schematic wiring diagram showing a motor driving device according to the embodiment of the present invention together with a motor and an AC power supply.

FIG. 2 is a schematic wiring diagram showing the motor driving device 1 according to the embodiment of the present invention together with the motor 2 and an AC power supply 10. The motor driving device 1 receives electric power from the AC power supply 10 and thereby drives the motor 2. As shown in FIG. 2, the motor driving device 1 includes a converter 20, an inverter 30, a connection switcher 50, a control unit 60 and short-circuiting circuits 80 and 90. Further, the motor driving device 1 may include a reactor 21, a capacitor 22, a voltage detection unit 40 and a current detection unit 70. Incidentally, the number of short-circuiting circuits is not limited to two but can also be three or more.

The converter 20 converts AC voltage supplied from the AC power supply 10 into DC voltage. The converter 20 is a DC voltage supply unit. The voltage detection unit 40 detects bus voltage as the DC voltage outputted from the converter 20.

The inverter 30 includes an upper arm 31 and a lower arm 32. U-phase, V-phase and W-phase switching elements forming the upper arm 31 and U-phase, V-phase and W-phase switching elements forming the lower arm 32 undergo PWM (Pulse Width Modulation) control by control signals Sr1 to Sr6 supplied from the control unit 60. The switching elements forming the upper arm 31 and the switching elements forming the lower arm 32 are semiconductor switching elements. The control signals Sr1 to Sr6 are represented also as control signals Sr. The inverter 30 receives the DC voltage as the bus voltage from the converter 20 and outputs AC voltage at a desired frequency. The inverter 30 applies its output voltage as an AC (Alternating Current) voltage to stator windings (also referred to simply as "windings") 2*a*, 2*b* and 2*c* of the motor 2 via the connection switcher 50.

The motor 2 is a three-phase permanent magnet synchronous motor. Ends of the U-phase, V-phase and W-phase windings 2*a* to 2*c* of the motor 2 are extracted to the outside of the motor 2 and connected to the inverter 30 and the connection switcher 50.

The connection switcher 50 includes electromagnetic contactors 51, 52 and 53 as selector switches connected to the U-phase, V-phase and W-phase windings 2*a* to 2*c* of the motor 2. Each electromagnetic contactor 51-53 is a device that switches the condition by electromagnetically opening or closing contact points. The electromagnetic contactor 51-53 is referred to also as a relay, a contactor, etc. The connection switcher 50 switches the connection condition of the windings 2*a* to 2*c* of the motor 2 by switching the connection condition between the contact points of the electromagnetic contactors 51 to 53. In the example of FIG. 2, by the switching of the condition of the connection switcher 50, the connection condition of the windings 2*a* to 2*c* of the motor 2 is switched to the Y connection or the Δ connection.

Each short-circuiting circuit 80, 90 includes a rectification circuit 81, 91 that lets through the current in one direction and a switch 82, 92. The rectification circuit 81, 91 is a diode rectification circuit formed with diodes for the U phase, the V phase and the W phase. The switch 82, 92 is desired to be a semiconductor switching element with a high operating speed. When the switch 82, 92 is ON, an electric current caused by back electromotive force occurring in the windings 2a to 2c in the rotating operation of the motor 2 is allowed to flow into the rectification circuit 81, 91 and the switch 82, 92 as a circulating current.

The control unit 60 controls the inverter 30 based on the bus voltage detected by the voltage detection unit 40, the current measured by the current detection unit 70, or both of the bus voltage and the current.

For example, the control unit 60 is capable of calculating the rotation phase of the motor 2 by checking the waveform of a current flowing through a shunt resistor for current detection connected to the lower arm 32 of the inverter 30. The control unit 60 provides the inverter 30 with a control signal Sr, provides the connection switcher 50 with a control signal Sw, and provides the short-circuiting circuits 80 and 90 with control signals C1 and C2. Incidentally, the control unit 60 may include a memory as a storage unit that stores a program and a processor such as a CPU (Central Processing Unit) that executes the program.

By setting the switches 82 and 92 to ON in a period in which the outputting of the AC output voltage by the inverter 30 is stopped, that is, a period in which the output voltage of the inverter 30 is zero, the electric current caused by the back electromotive force in the windings 2a to 2c of the motor 2 in the rotating operation is fed to a circulating circuit formed by the short-circuiting circuits 80 and 90 and the windings 2a to 2c as a circulating current. The connection switcher 50 switches the connection condition of the windings 2a to 2c of the motor 2 in a period in which the circulating current is flowing.

By setting the switches 82 and 92 at ON (on) and setting the upper arm 31 and the lower arm 32 at all-phase OFF (off) as above, the current flowing through the motor 2 circulates in the circulating circuit as a path including the short-circuiting circuits 80 and 90, and thus no current flows into the electromagnetic contactors 51 to 53 of the connection switcher 50. Therefore, no arc discharge occurs between the contact points of the electromagnetic contactors 51 to 53 at the time of switching the condition of the electromagnetic contactors 51 to 53 of the connection switcher 50 for the switching of the connection condition. Accordingly, no failure occurs in the electromagnetic contactors 51 to 53 of the connection switcher 50 even if the condition of the electromagnetic contactors 51 to 53 is switched without stopping the rotating operation of the motor.

(2-2) Operation

Figure 3:
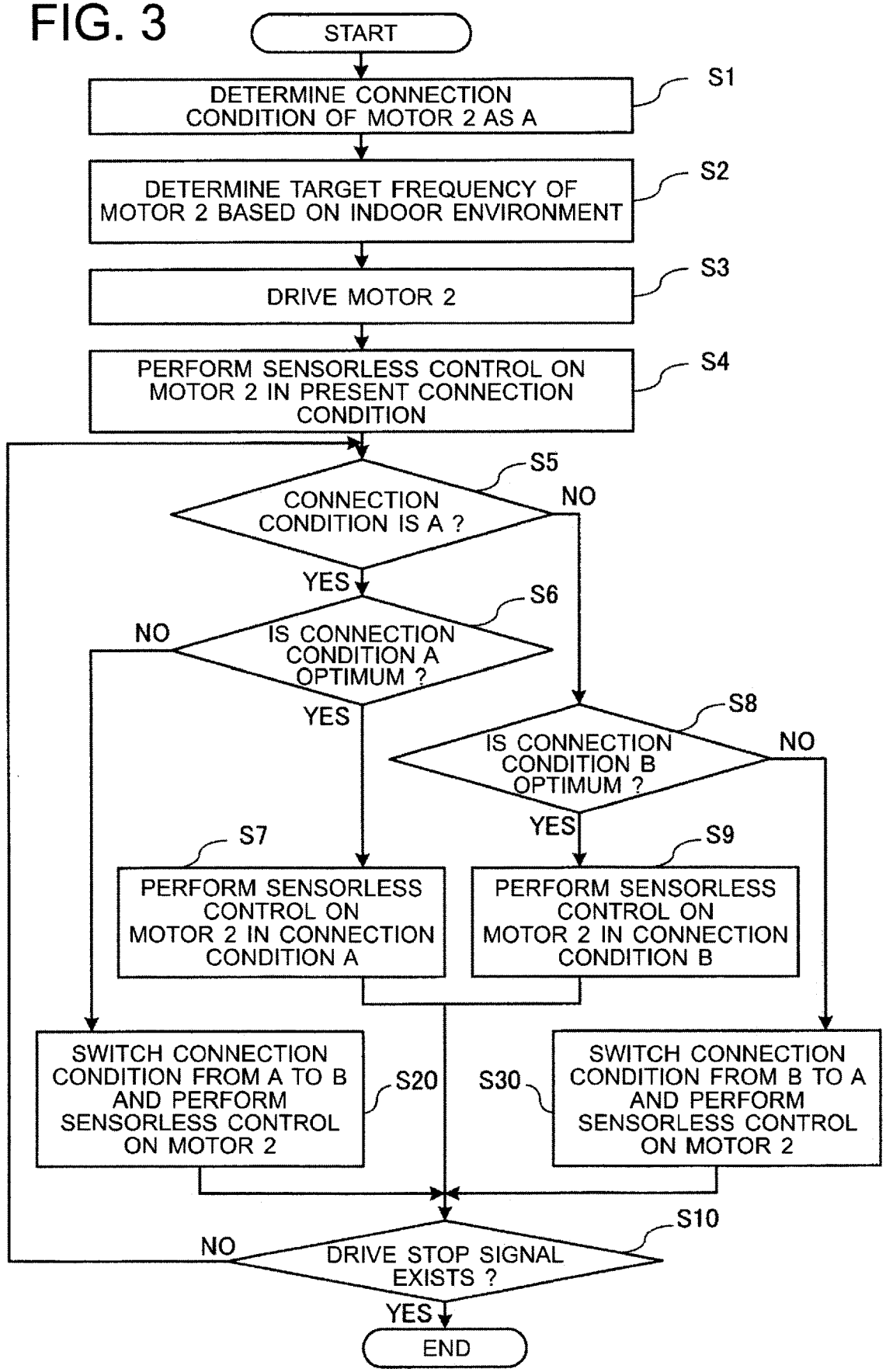
FIG. 3 is a flowchart showing an operation of the motor driving device according to the embodiment.

FIG. 3 is a flowchart showing an operation of the motor driving device 1 according to the embodiment. In FIG. 3, the connection conditions A and B are the Y connection and the Δ connection, for example. However, the connection conditions A and B are not limited to the Y connection and the Δ connection.

As shown in FIG. 3, the control unit 60 first determines the connection condition of the motor 2 as A (step S1) and sets the connection condition to A by sending the control signal Sw to the connection switcher 50. Subsequently, the control unit 60 determines a target frequency of the motor 2 based on the indoor environment (step S2). Subsequently, the control unit 60 drives the motor 2 by executing a startup control process for the motor 2 (step S3). Thereafter, the control unit 60 performs sensorless control on the motor 2 based on a current value obtained by the current detection unit 70. However, it is also possible to detect a rotational position of the motor 2 by using a sensor and make the control unit 60 control the motor 2 based on the detected value.

Subsequently, the control unit 60 judges whether or not the connection condition is A (step S5). If the connection condition is A, the control unit 60 advances the process from the step S5 to step S6 and judges whether or not the connection condition A is optimum (step S6). If the connection condition A is optimum, the control unit 60 advances the process from the step S6 to step S7 and performs the sensorless control on the motor 2 in the connection condition A (step S7). If the connection condition A is not optimum, the control unit 60 advances the process from the step S6 to step S20, switches the connection condition from A to B in the rotating operation of the motor 2, and performs the sensorless control on the motor 2 in the connection condition B (step S20). Details of the process in the step S20 will be described later by using FIG. 4A and FIG. 5.

If the connection condition is not A in the step S5, the control unit 60 advances the process from the step S5 to step S8 and judges whether or not the connection condition B is optimum (step S8). If the connection condition B is optimum, the control unit 60 advances the process from the step S8 to step S9 and performs the sensorless control on the motor 2 in the connection condition B (step S9). If the connection condition B is not optimum, the control unit 60 advances the process from the step S8 to step S30, switches the connection condition from B to A in the rotating operation of the motor 2, and performs the sensorless control on the motor 2 in the connection condition A (step S30). Details of the process in the step S30 will be described later by using FIG. 4B and FIG. 5.

Thereafter, the control unit 60 judges whether a drive stop signal exists or not (step S10) and stops the operation of the motor 2 if the drive stop signal exists. If the drive stop signal does not exist, the control unit 60 returns the process from the step S10 to the step S5. In other words, the control unit 60 repeats the process indicated as the steps S5 to S10, S20 and S30 until the drive stop signal is inputted.

Figure 4A:
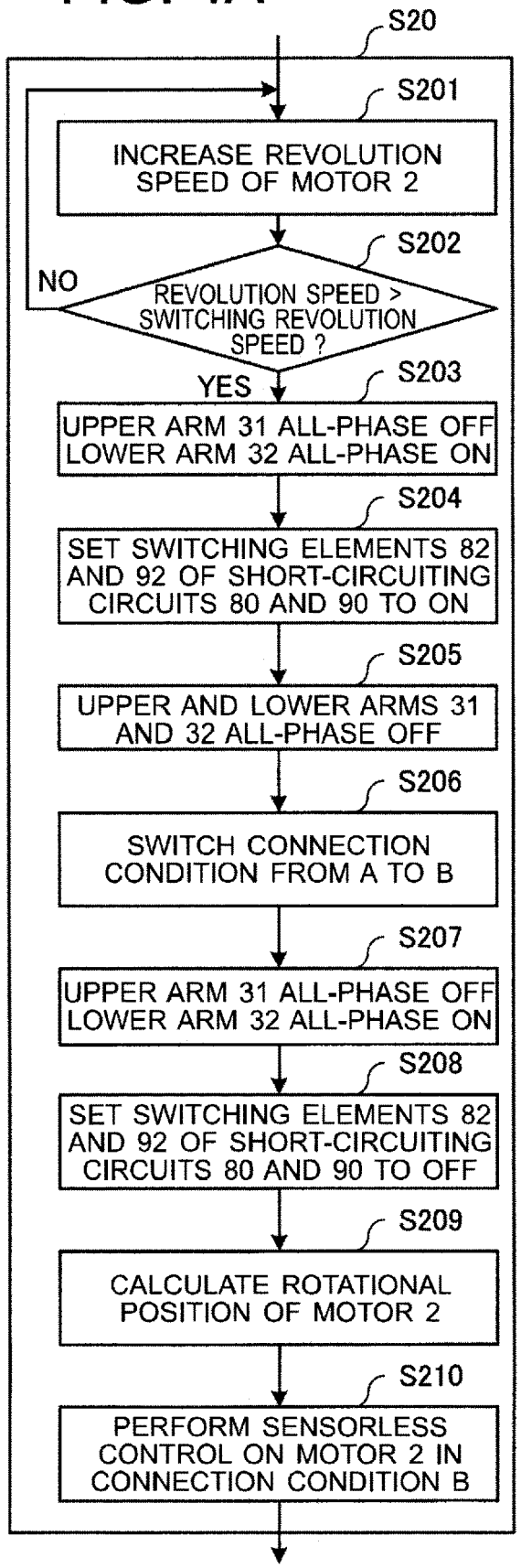
FIGS. 4A and 4B are flowcharts showing details of the processes in steps S20 and S30 in FIG. 3.
Figure 4B:
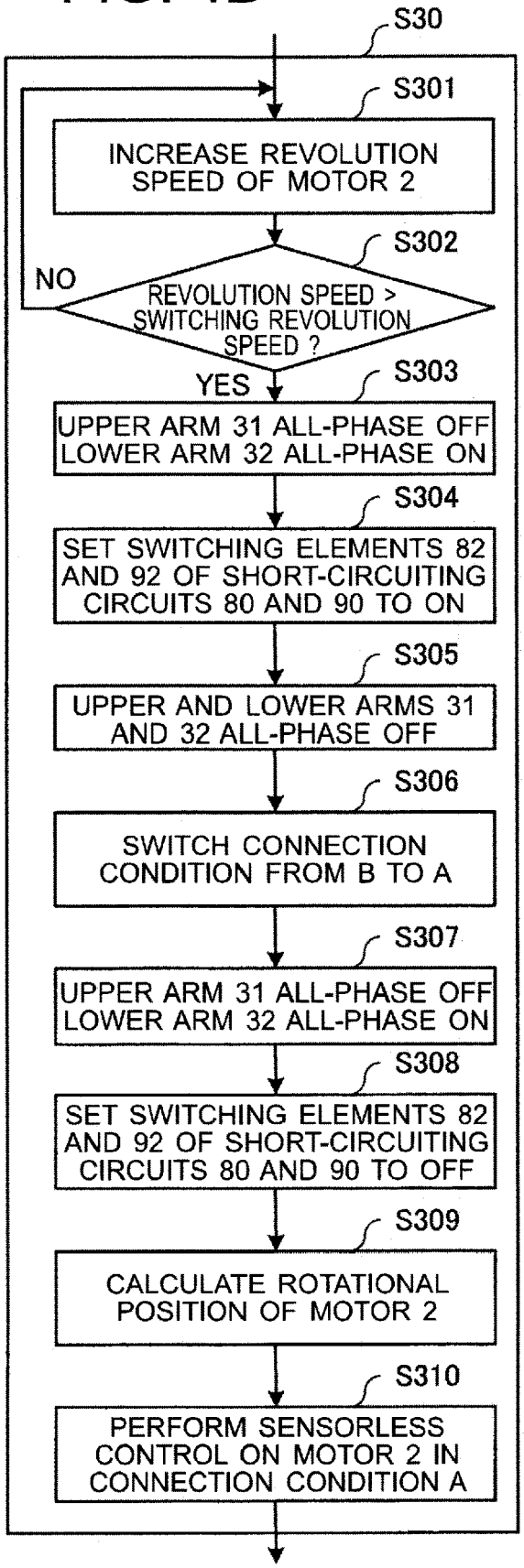
Figure 5:
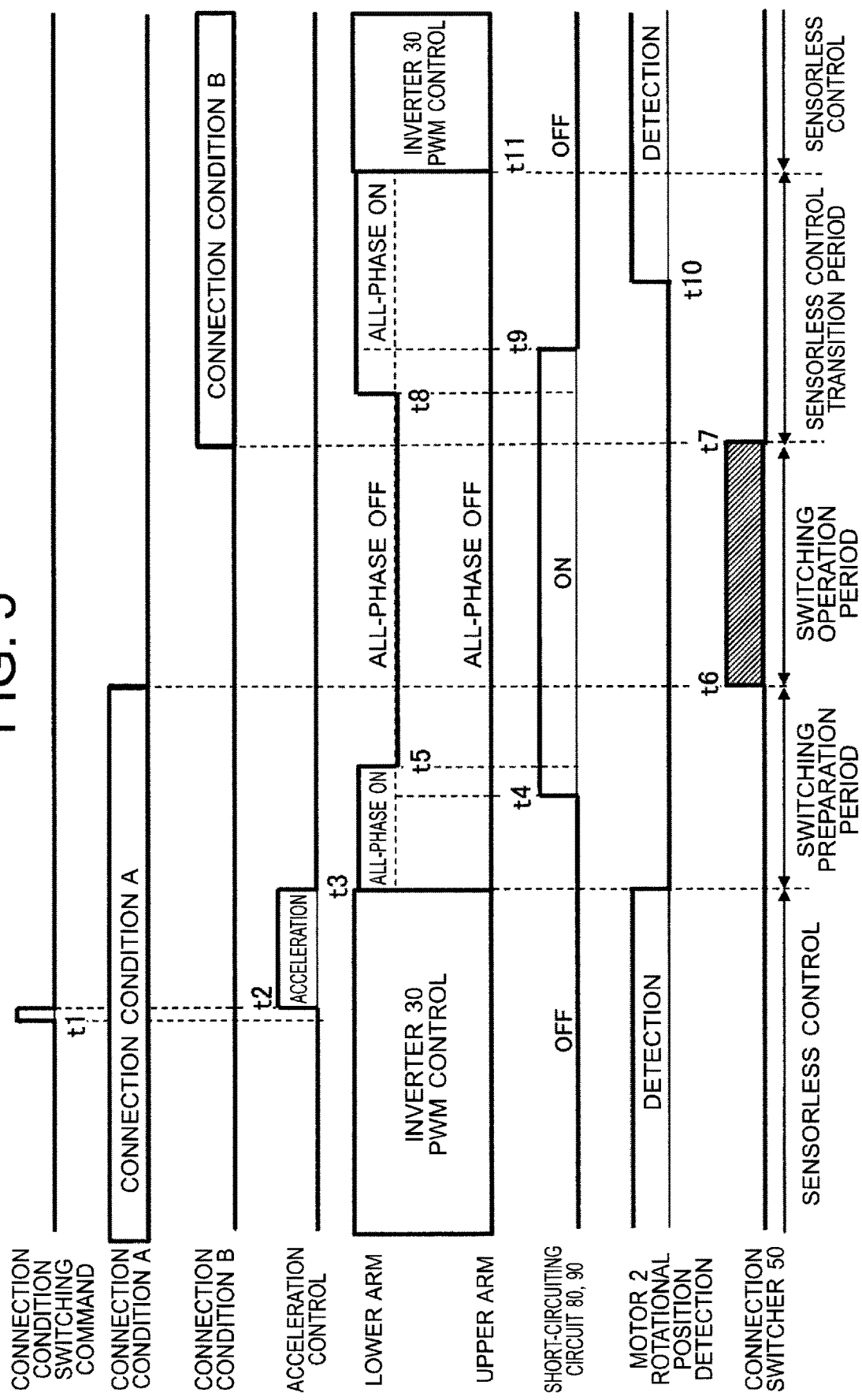
FIG. 5 is a timing chart showing an operation of the motor driving device according to the embodiment.

FIGS. 4A and 4B are flowcharts showing details of the processes in the steps S20 and S30 in FIG. 3. FIG. 5 is a timing chart showing an operation of the motor driving device 1 according to the embodiment. Incidentally, in FIGS. 4A and 4B and FIG. 5, the connection conditions A and B are the Y connection and the Δ connection, for example. However, the connection conditions A and B are not limited to the Y connection and the Δ connection.

As shown in FIG. 4A, in step S20, the control unit 60 outputs a connection condition switching command (time t1 in FIG. 5) and increases the revolution speed of the motor 2 by performing PWM control on the inverter 30 (step S201, time t2-t3 in FIG. 5).

Subsequently, the control unit 60 judges whether or not the revolution speed of the motor 2 has exceeded a predetermined switching revolution speed (step S202). Namely, the control unit 60 increases the revolution speed of the motor 2 and judges whether or not the revolution speed has reached the switching revolution speed in an overmodulation region. If the revolution speed of the motor 2 has exceeded the switching revolution speed, the control unit 60 advances the process from the step S202 to step S203, sets the upper arm 31 of the inverter 30 at all-phase OFF, and sets the lower arm 32 at all-phase ON (step S203, time t3 in FIG. 5). To set the upper arm 31 at all-phase OFF means to set all of the U-phase, V-phase and W-phase switching elements forming the upper arm 31 at OFF. To set the lower arm 32 at all-phase ON means to set all of the U-phase, V-phase and W-phase switching elements forming the lower arm 32 at ON. In this case, the value of the output voltage of the inverter 30 is zero and the value of the voltage applied to the motor 2 and the connection switcher 50 is also zero. If the revolution speed is less than or equal to the switching revolution speed, the control unit 60 returns the process from the step S202 to the step S201.

Subsequently, the control unit 60 sets the switches 82 and 92 of the short-circuiting circuits 80 and 90 to ON (step S204, time t4 in FIG. 5). When the switches 82 and 92 of the short-circuiting circuits 80 and 90 are turned ON, the value of the output voltage of the inverter 30 is zero.

Subsequently, the control unit 60 sets the upper arm 31 of the inverter 30 at all-phase OFF and sets the lower arm 32 at all-phase OFF (step S205, time t5 in FIG. 5). To set the lower arm 32 at all-phase OFF means to set all of the U-phase, V-phase and W-phase switching elements forming the lower arm 32 at OFF.

Subsequently, the control unit 60 switches the connection condition from A to B by controlling the connection switcher 50 (step S206, time t6-t7 in FIG. 5). Namely, the switching of the connection condition by the connection switcher 50 is performed when the upper arm 31 of the inverter 30 is all-phase OFF, the lower arm 32 is all-phase OFF, and the switches 82 and 92 of the short-circuiting circuits 80 and 90 are ON.

Subsequently, the control unit 60 sets the upper arm 31 of the inverter 30 at all-phase OFF and sets the lower arm 32 at all-phase ON (step S207, time t8 in FIG. 5).

Subsequently, the control unit 60 sets the switches 82 and 92 of the short-circuiting circuits 80 and 90 to OFF (step S208, time t9 in FIG. 5).

Subsequently, the control unit 60 calculates the rotational position of the motor 2 (step S209, time t10-t11 in FIG. 5). Specifically, after completing the switching operation, the control unit 60 switches the condition of the switches 82 and 92 of the short-circuiting circuits 80 and 90 from ON to OFF and calculates the phase of the motor 2 based on the current supplied from the lower arm 32 of the inverter 30. Based on the calculated phase information, the control unit 60 switches the motor 2 from a free rotation state as an uncontrolled state to a sensorless control state without stopping the rotating operation of the motor 2. The control unit 60 performs the sensorless control on the motor 2 in the connection condition B (step S210, after time t11 in FIG. 5).

Processes in steps S301 to S310 shown in FIG. 4B are similar to the processes in the steps S201 to S210 shown in FIG. 4A.

Figure 6:
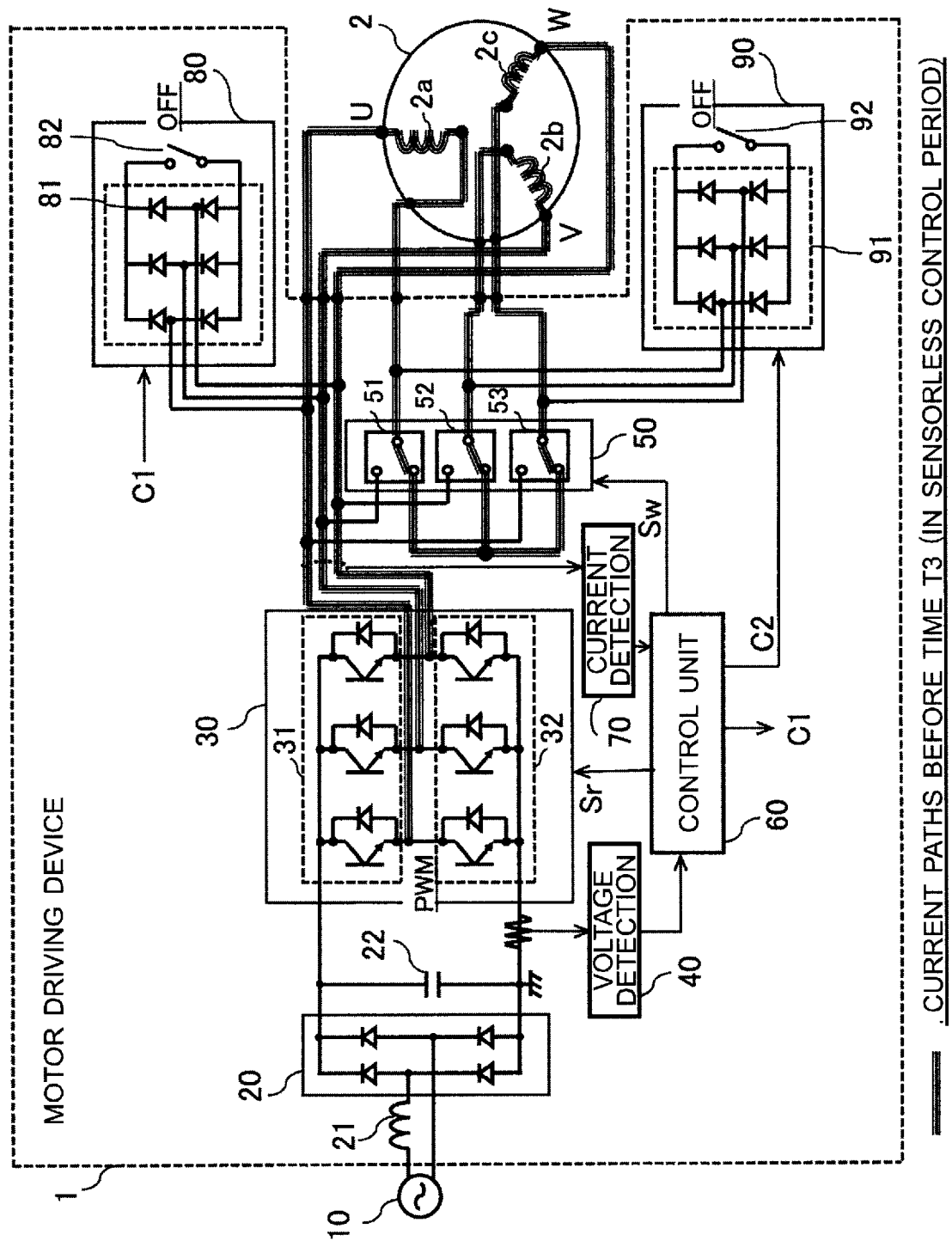
FIG. 6 is a diagram showing paths of a current flowing through windings of the motor in a connection condition of Y connection and a connection switcher of the motor driving device in a sensorless control period.

FIG. 6 is a diagram showing paths of a current flowing through the windings 2a to 2c of the motor 2 in the connection condition of the Y connection and the connection switcher 50 of the motor driving device 1 in a sensorless control period (e.g., before time t3 in FIG. 5). FIG. 6 shows the current paths in the step S7 in FIG. 3 and the step S201 in FIG. 4A, for example. In FIG. 6, thick lines as triple lines indicate the current paths on a downstream side of the inverter 30 when the motor 2 in the connection condition of the Y connection is undergoing the sensorless control based on the rotational position of the motor 2 calculated based on the current value obtained by the current detection unit 70.

Figure 7:
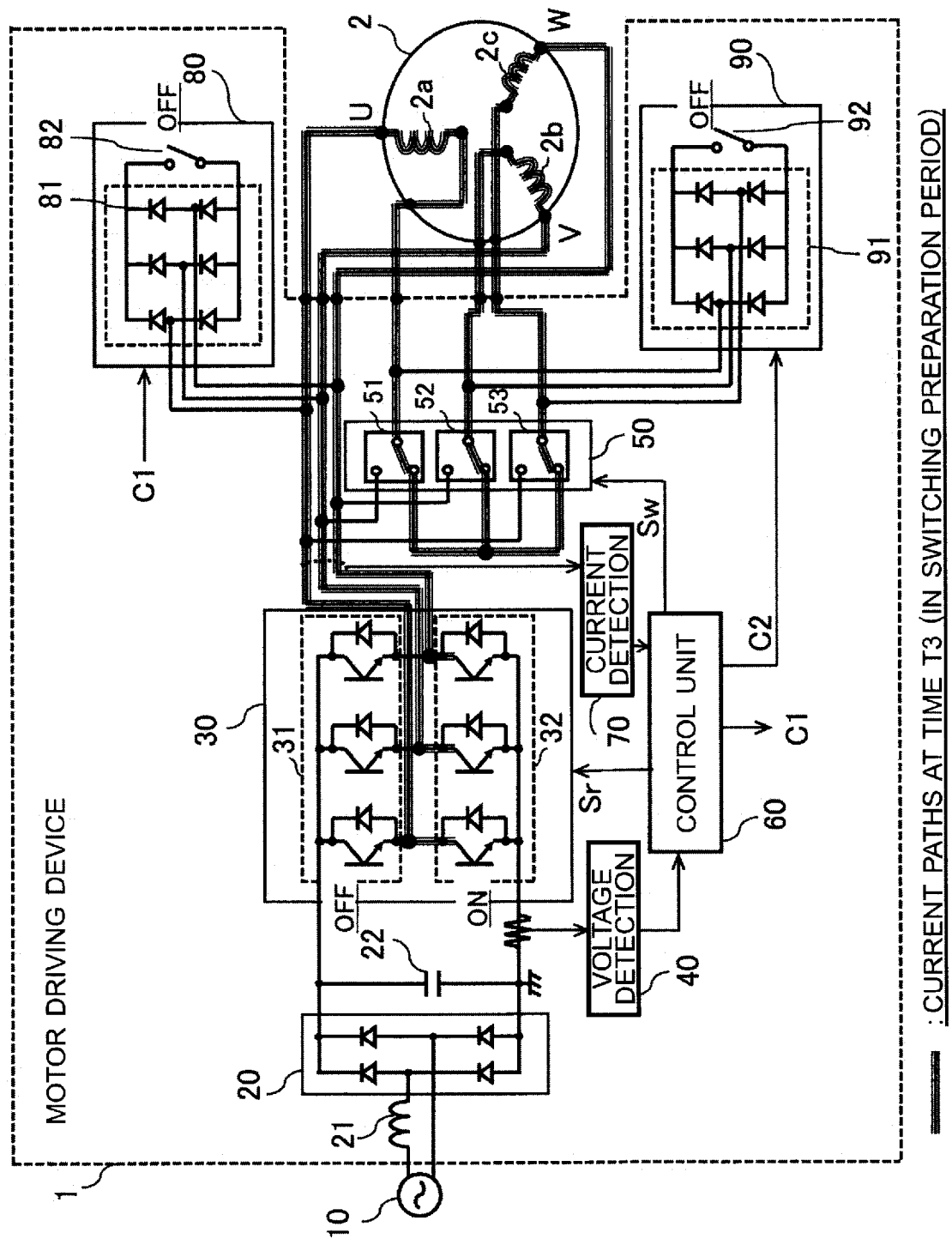
FIG. 7 is a diagram showing paths of a current flowing through the windings of the motor in the connection condition of the Y connection and the connection switcher of the motor driving device in a connection condition switching preparation period.

FIG. 7 is a diagram showing paths of a current flowing through the windings 2a to 2c of the motor 2 in the connection condition of the Y connection and the connection switcher 50 of the motor driving device 1 in a connection condition switching preparation period (e.g., time t3 in FIG. 5). FIG. 7 shows the current paths in the step S203 in FIG. 4A, for example. In FIG. 7, thick lines as triple lines indicate the current paths on the downstream side of the inverter 30 when the motor 2 is in the connection condition of the Y connection, the upper arm 31 of the inverter 30 is all-phase OFF, and the lower arm 32 is all-phase ON.

Figure 8:
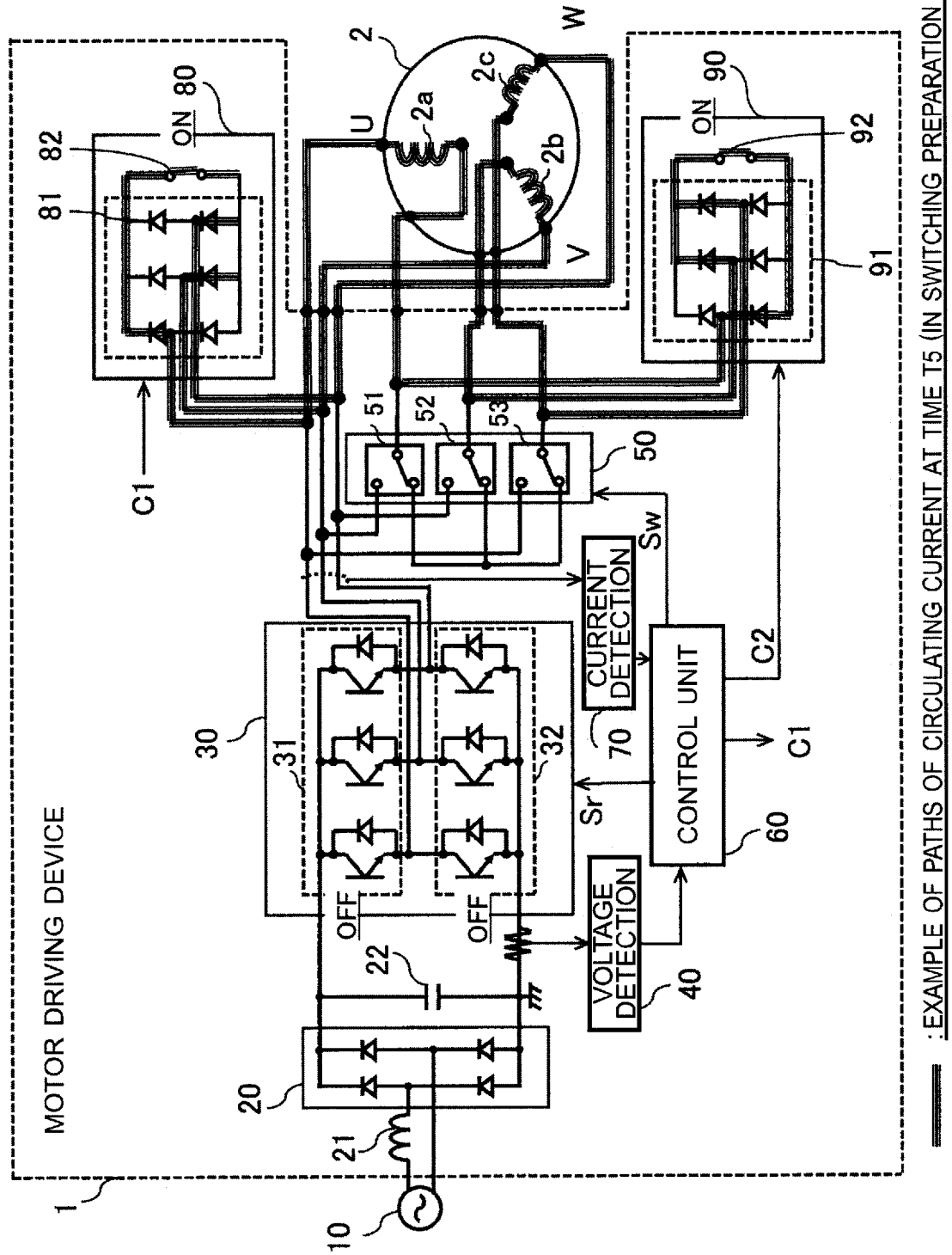
FIG. 8 is a diagram showing paths of a current flowing through the windings of the motor and short-circuiting circuits of the motor driving device in the connection condition switching preparation period.

FIG. 8 is a diagram showing paths of a current flowing through the windings 2a to 2c of the motor 2 and the short-circuiting circuits 80 and 90 of the motor driving device 1 in the connection condition switching preparation period (e.g., time t5 in FIG. 5). FIG. 8 shows the current paths in the step S205 in FIG. 4A, for example. In FIG. 8, thick lines as triple lines indicate the paths of the current flowing through the windings 2a to 2c of the motor 2 and the short-circuiting circuits 80 and 90 when the switches 82 and 92 of the short-circuiting circuits 80 and 90 are ON. As shown in FIG. 8, by setting the switches 82 and 92 at ON and setting the upper arm 31 and the lower arm 32 at all-phase OFF, the current flowing through the motor 2 circulates through the path including the short-circuiting circuits 80 and 90, and thus no current flows into the electromagnetic contactors 51 to 53 of the connection switcher 50.

Figure 9:
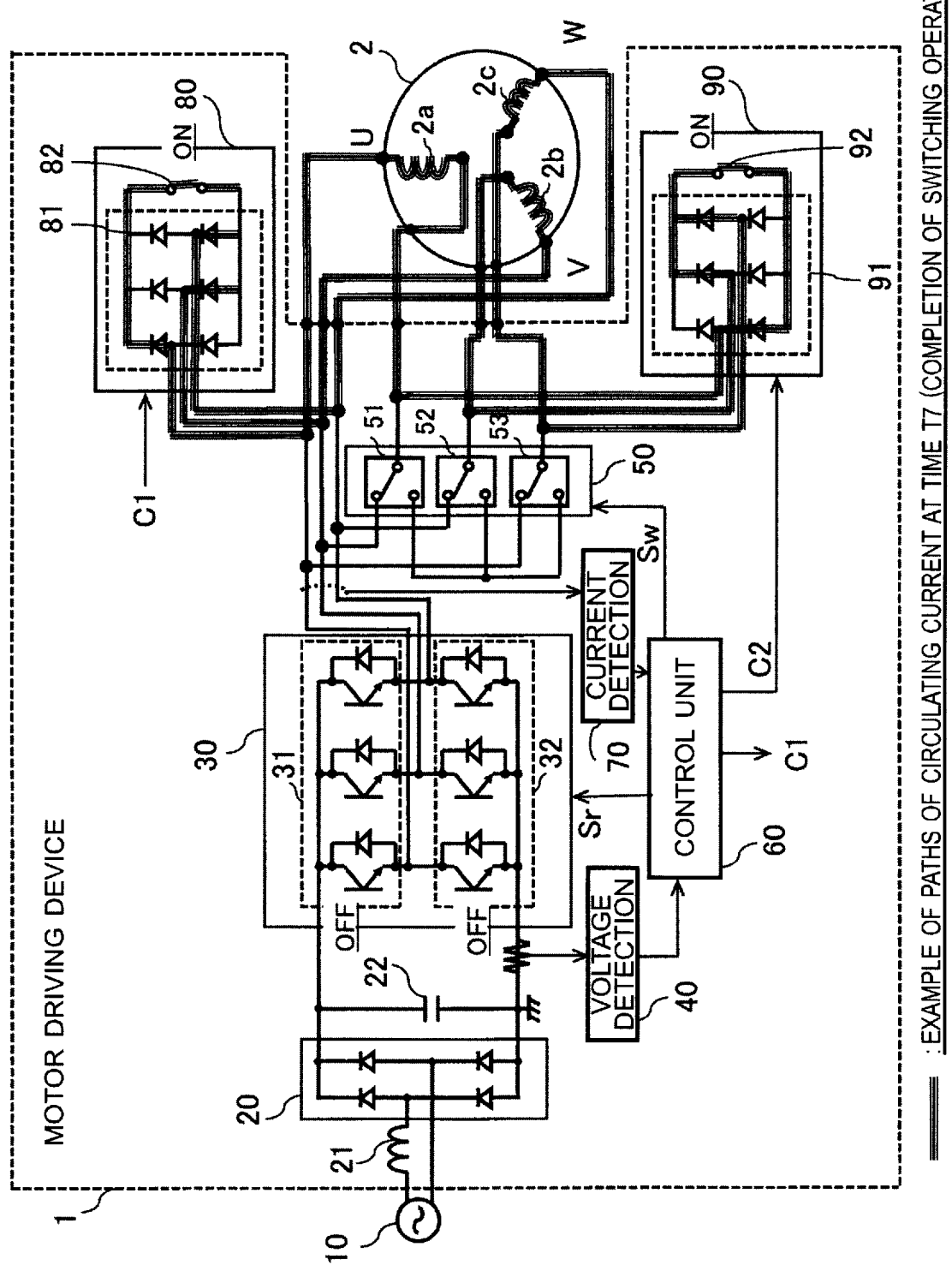
FIG. 9 is a diagram showing paths of a current flowing through the windings of the motor and the short-circuiting circuits of the motor driving device when a connection condition switching operation is completed.

FIG. 9 is a diagram showing paths of a current flowing through the windings 2a to 2c of the motor 2 and the short-circuiting circuits 80 and 90 of the motor driving device 1 in a switching period for switching the connection condition (e.g., time t7 in FIG. 5). FIG. 9 shows the current paths in the step S206 in FIG. 4A, for example. In FIG. 9, thick lines as triple lines indicate the paths of the current flowing through the windings 2a to 2c of the motor 2 and the short-circuiting circuits 80 and 90 when the switches 82 and 92 of the short-circuiting circuits 80 and 90 are ON. As shown in FIG. 9, by setting the switches 82 and 92 at ON and setting the upper arm 31 and the lower arm 32 at all-phase OFF, the current flowing through the motor 2 circulates through the path including the short-circuiting circuits 80 and 90, and thus no current flows into the electromagnetic contactors 51 to 53 of the connection switcher 50. Therefore, no arc discharge occurs between the contact points of the electromagnetic contactors 51 to 53 at the time of switching the condition of the electromagnetic contactors 51 to 53 of the connection switcher 50 for the switching of the connection condition. Accordingly, no failure occurs in the electromagnetic contactors 51 to 53 of the connection switcher 50.

Figure 10:
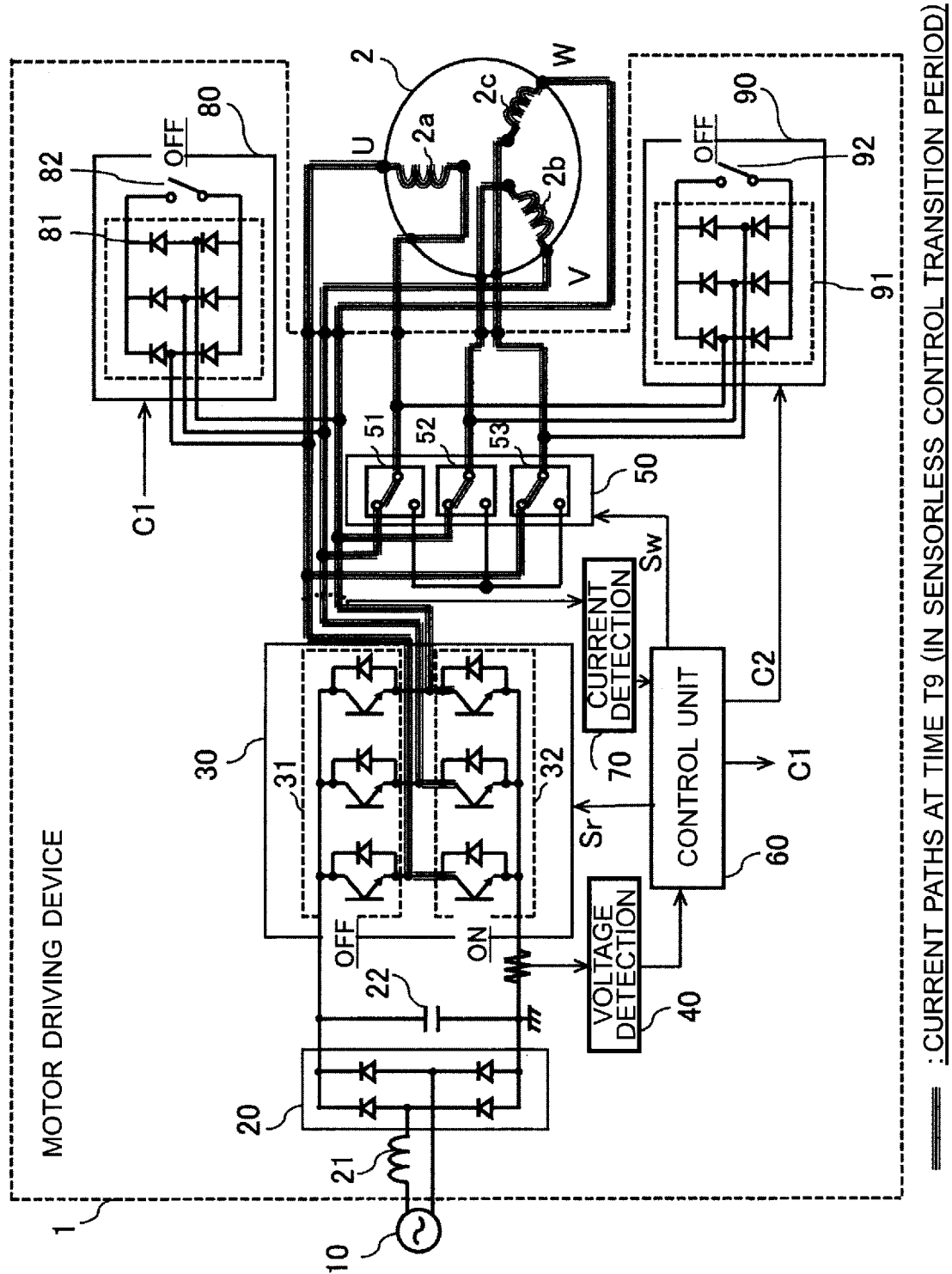
FIG. 10 is a diagram showing paths of a current for rotational position calculation of the motor flowing through the windings of the motor and the motor driving device in a period in which an upper arm of an inverter is all-phase OFF, a lower arm is all-phase ON, and switches of the short-circuiting circuits are OFF.

FIG. 10 is a diagram showing paths of a current for the rotational position calculation of the motor 2 flowing through the windings 2a to 2c of the motor 2 and the motor driving device 1 in a period in which the upper arm 31 of the inverter 30 is all-phase OFF, the lower arm 32 is all-phase ON, and the switches 82 and 92 of the short-circuiting circuits 80 and 90 are OFF (e.g., time t9 in FIG. 5). In FIG. 10, thick lines as triple lines indicate the current paths in the step S209 in FIG. 4A, for example. In FIG. 10, current paths are formed between the lower arm 32 and the motor 2 since the lower arm 32 of the inverter 30 is all-phase ON and the upper arm 31 of the inverter 30 is all-phase OFF. This makes it possible to calculate the rotation phase of the motor 2 by checking the waveform of the current flowing through the shunt resistor for the current detection connected to the lower arm 32 of the inverter 30.

Figure 11:
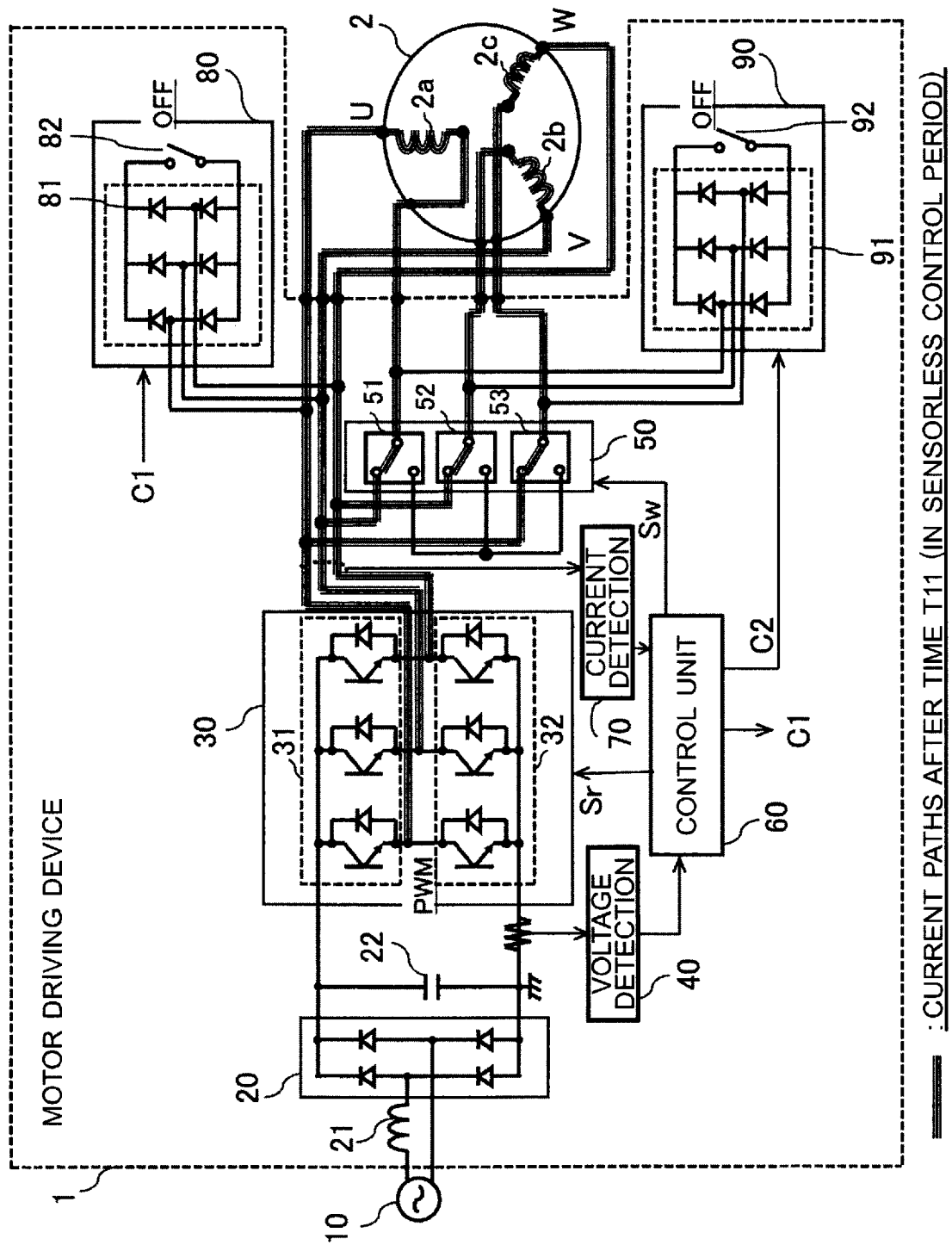
FIG. 11 is a diagram showing paths of a current flowing through the windings of the motor in the connection condition of Δ connection and the connection switcher of the motor driving device in the sensorless control period.

FIG. 11 is a diagram showing paths of a current flowing through the windings 2a to 2c of the motor 2 in the connection condition of the Δ connection and the connection switcher 50 of the motor driving device 1 in the sensorless control period (e.g., after time t11 in FIG. 5). FIG. 11 shows the current paths in the step S210 in FIG. 4A, for example. In FIG. 11, thick lines as triple lines indicate the current paths on the downstream side of the inverter 30 when the motor 2 in the connection condition of the Δ connection is undergoing the sensorless control based on the rotational position of the motor 2 calculated based on the current value obtained by the current detection unit 70.

Figure 12:
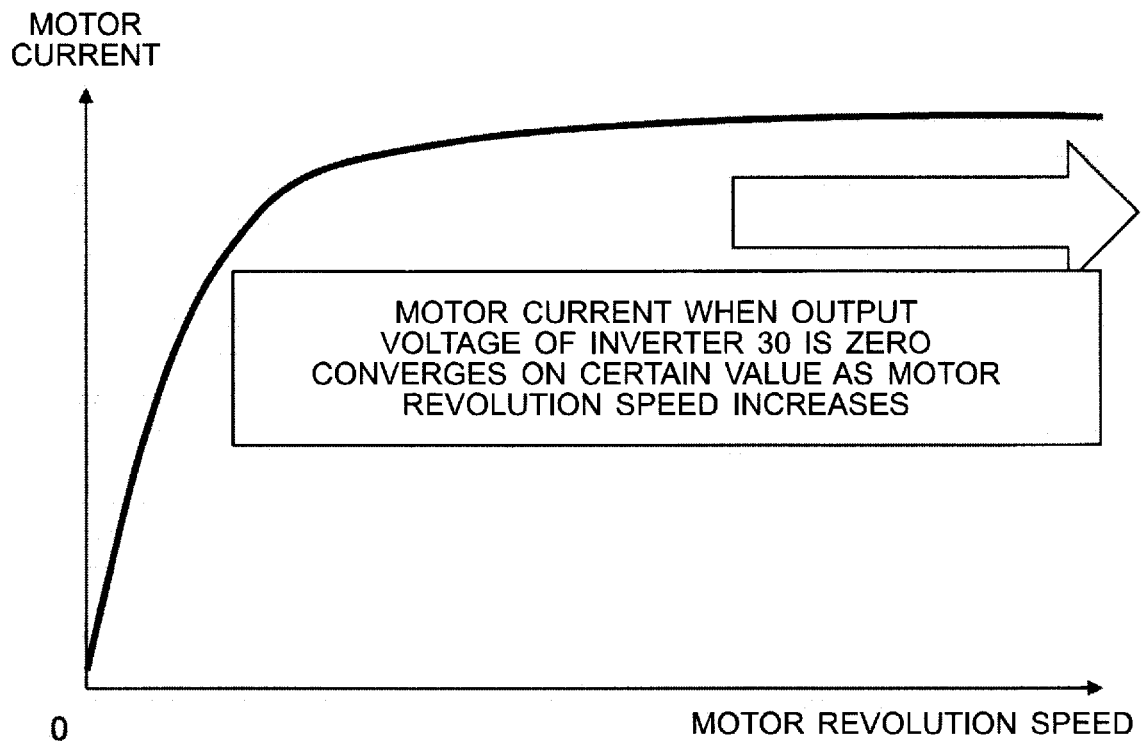
FIG. 12 is a diagram showing the relationship between a motor revolution speed and a motor current when an output voltage of the inverter is zero in the form of a graph.

FIG. 12 is a diagram showing the relationship between a motor revolution speed as the revolution speed of the motor 2 and a motor current as the current flowing through the motor 2 when the output voltage of the inverter 30 is zero in the form of a graph. In other words, the graph of FIG. 12 shows a property of a current peak value with respect to the revolution speed of the motor 2 when the output voltage of the inverter 30 is set at zero. It is known that a voltage equation of a permanent magnet synchronous motor is represented by the following expression 1:

$$\begin{bmatrix} V_d \\ V_q \end{bmatrix} = \begin{bmatrix} R & -\omega L_q \\ \omega L_d & R \end{bmatrix} \begin{bmatrix} i_d \\ i_q \end{bmatrix} + \begin{bmatrix} 0 \\ \omega \phi_f \end{bmatrix} \qquad (1)$$

Here, $V_d$ and $V_q$ represent dq-axis voltages, $I_d$ and $I_q$ represent dq-axis currents, ω represents an electric angular frequency, R represents winding resistance, $L_d$ and $L_q$ represent dq-axis inductances, and $\phi_f$ represents an inductive voltage constant.

In this embodiment, $V_d = V_q = 0$ holds since the switching of the connection condition by the connection switcher 50 is performed when the output voltage of the inverter 30 is zero. Therefore, the d-axis current $I_d$ and the q-axis current $I_q$ are represented by the following expressions (2) and (3):

$$I_d = \frac{\omega^2 \phi_f R}{R^2 + \omega^2 * L_q^2} \qquad (2)$$

$$I_q = \frac{\omega \phi_f R}{R^2 + \omega^2 * L_q^2} \qquad (3)$$

Further, motor torque $\tau_m$ is represented by the following expression (4):

$$\tau_m = P_m \phi_f I_q + P_m (L_d - L_q) I_d I_q \qquad (4)$$

Since motor constants (R, $L_d$, $L_q$, $\phi_f$) are fixed values, it can be seen from the above expressions (2) to (4) that the dq-axis currents $I_d$ and $I_q$ of the motor 2 change depending on the revolution speed ω of the motor 2 and the motor torque $\tau_m$ changes depending on the dq-axis currents $I_d$ and $I_q$. Further, the peak value $I_p$ of the motor current can be represented by the following expression (5):

$$I_p = \frac{\sqrt{2}}{\sqrt{3}} \frac{\omega^2 \phi_f \sqrt{R^2 + \omega^2 * L_q^2}}{R^2 + \omega^2 * L_q^2} \qquad (5)$$

From the expression (5), the motor revolution speed-motor current property graph shown in FIG. 12 is obtained in the coordinate system in which the horizontal axis is a coordinate axis representing the motor revolution speed and the vertical axis is a coordinate axis representing the current peak value $I_p$ of the motor current. As seen in FIG. 12, when the output voltage of the inverter 30 is set at zero, the motor current converges on a certain value as the revolution speed of the motor 2 increases.

Figure 13:
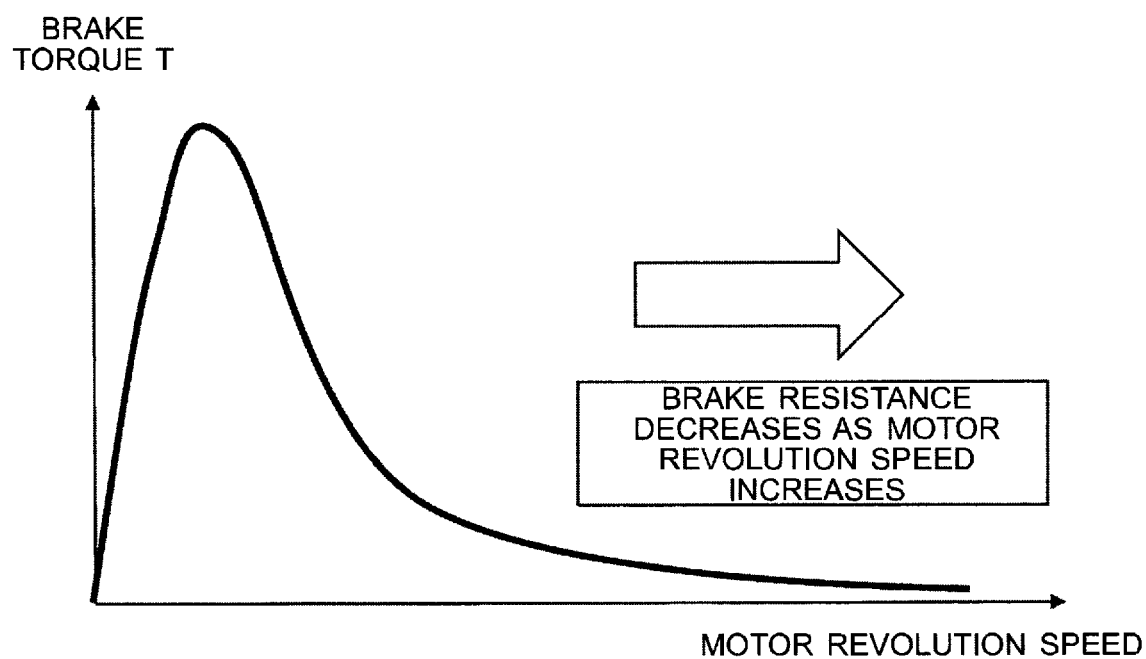
FIG. 13 is a diagram showing the relationship between the motor revolution speed and brake torque of the motor in the form of a graph.

FIG. 13 is a diagram showing the relationship between the motor revolution speed and brake torque T ($=\tau_b$) of the motor 2 in the form of a graph. FIG. 13 shows a property of the brake torque T of the motor 2 with respect to the motor revolution speed in the coordinate system in which the horizontal axis represents the motor revolution speed and the vertical axis represents the brake torque T of the motor 2. It is seen in FIG. 13 that the brake torque T of the motor 2 when the output voltage of the inverter 30 is zero decreases as the motor revolution speed increases. The change Δω in the motor revolution speed can be represented by the following expression (6):

$$\Delta \omega = \frac{\tau_m - \tau_l}{J} \qquad (6)$$

Here, $\tau_m$ represents the motor torque, $\tau_l$ represents load torque, and J represents inertia.

When the output voltage of the inverter 30 is set at zero, the motor torque $\tau_m$ works as the brake torque $\tau_b$. Namely, $\tau_m = -\tau_b$ holds when the output voltage of the inverter 30 is controlled at zero. Thus, it can be seen from the expression (6) that the brake torque $\tau_b$ decreases and the change Δω in the motor revolution speed decreases as the motor revolution speed increases.

Since the motor driving device 1 according to this embodiment executes the control of setting the output voltage of the inverter 30 at zero, the control of setting the output voltage at zero is possible irrespective of a voltage modulation factor of the inverter 30. Accordingly, if the control of setting the output voltage of the inverter 30 at zero is executed in the overmodulation region in which the motor 2 is capable of rotating at higher speed, the decrease in the revolution speed of the motor 2 can be inhibited, and consequently, the connection condition of the motor 2 can be switched without stopping the rotating operation of the motor 2 (i.e., in a nonstop manner).

By setting the switches 82 and 92 at ON (on) and setting the upper arm 31 and the lower arm 32 at all-phase OFF (off) as above, the current flowing through the motor 2 circulates in the circulating circuit as the path including the short-circuiting circuits 80 and 90, and thus no current flows into the electromagnetic contactors 51 to 53 of the connection switcher 50. Therefore, no arc discharge occurs between the contact points of the electromagnetic contactors 51 to 53 at the time of switching the condition of the electromagnetic contactors 51 to 53 of the connection switcher 50 for the switching of the connection condition. Accordingly, no failure occurs in the electromagnetic contactors 51 to 53 of the connection switcher 50 even if the condition of the electromagnetic contactors 51 to 53 is switched without stopping the rotating operation of the motor.

Figure 14:
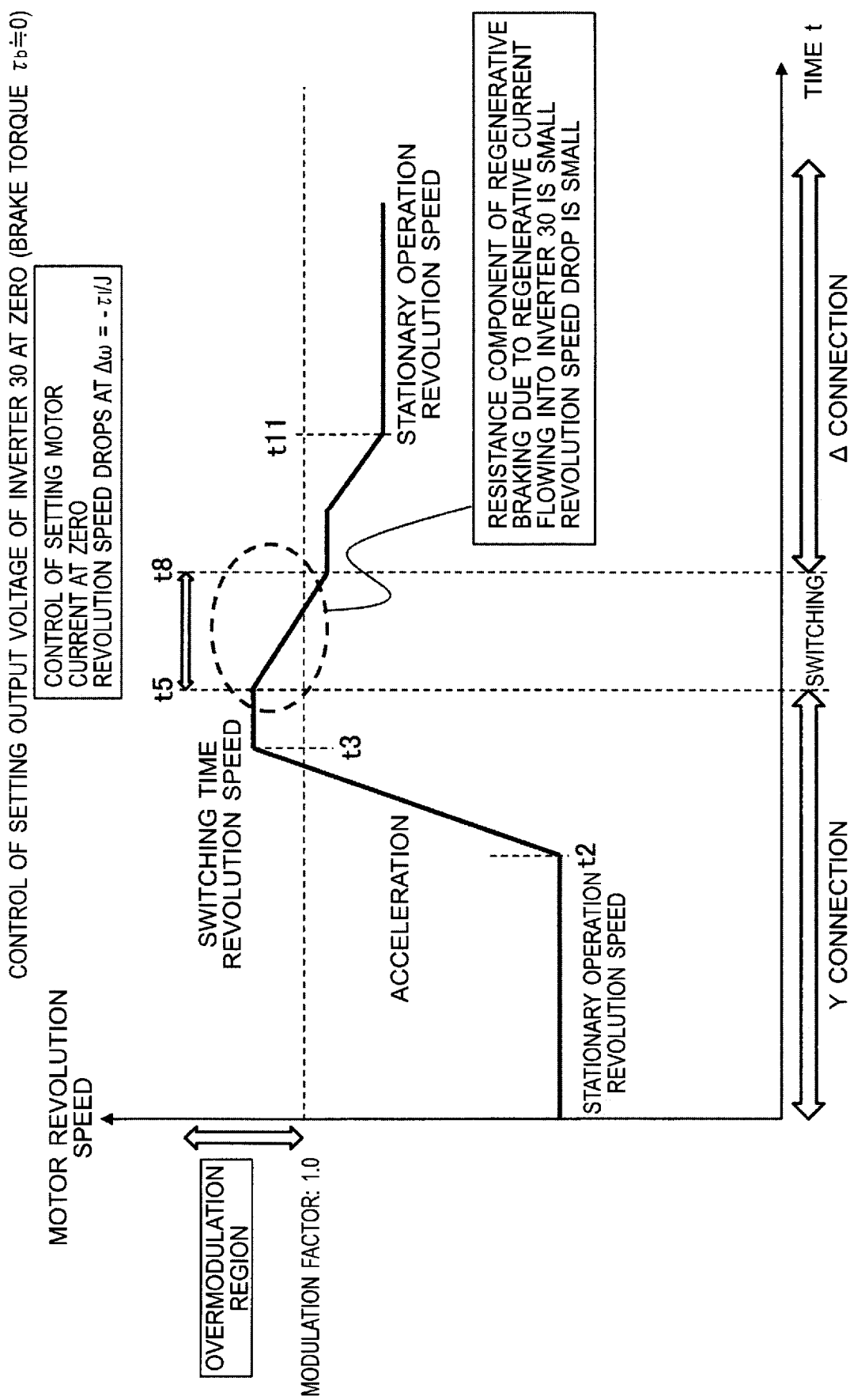
FIG. 14 is a diagram showing the motor revolution speed in a switching operation period for switching the connection condition from the Y connection to the Δ connection in the form of a graph.

FIG. 14 is a diagram showing the change in the revolution speed of the motor 2 when the connection condition is switched from the Y connection to the Δ connection in the form of a graph. As shown in FIG. 14, by executing the control of setting the output voltage of the inverter 30 at zero in a period after accelerating the revolution speed of the motor 2 to a high-speed region (i.e., the overmodulation region), that is, in a period in which the brake torque $\tau_b$ is low, the decrease in the revolution speed of the motor 2 can be reduced. In other words, the falling gradient of the line segment indicating the decrease in the motor revolution speed shown between the times t5 and t8 in FIG. 14 can be made gradual.

Further, in this embodiment, the connection switching of the motor 2 in the overmodulation region can be executed while setting the output voltage of the inverter 30 at zero. Therefore, the connection switching operation at higher revolution speed compared to the conventional method is possible. Accordingly, application to motors whose overmodulation region is set at low revolution speeds is possible and the connection condition of the motor can be switched without stopping the rotation of the motor (i.e., in the nonstop manner) even in a motor whose motor revolution speed is likely to drop to approximately zero in the switching operation due to high load torque.

(2-3) Modification

Figure 15:
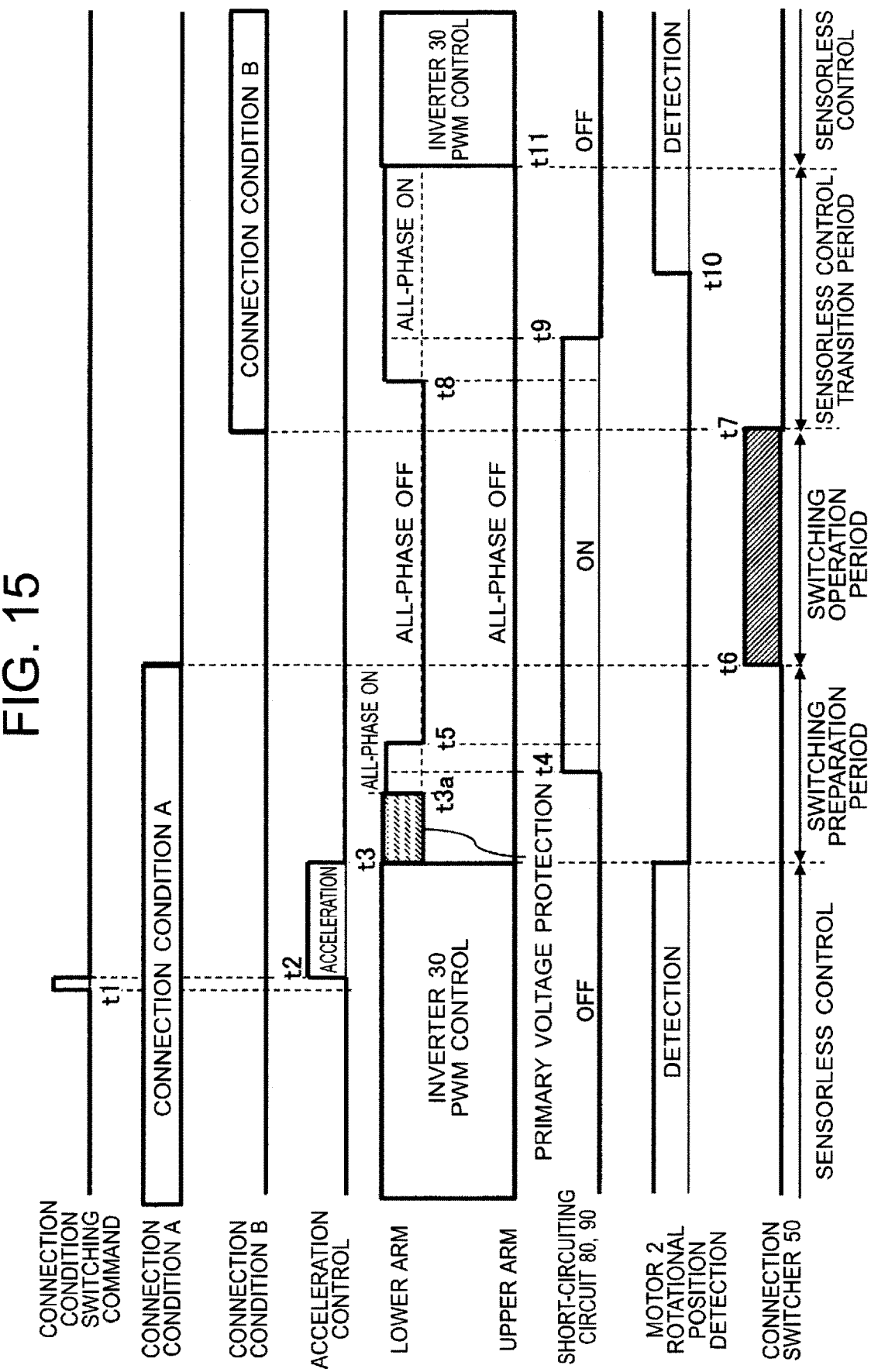
FIG. 15 is a timing chart showing an operation of a motor driving device according to a modification of the embodiment.

FIG. 15 is a timing chart showing an operation of a motor driving device according to a modification of the embodiment. FIG. 15 differs from the timing chart shown in FIG. 5 in that a primary voltage protection operation is executed at time t3 to t3a. FIG. 16 is a diagram showing an example of the primary voltage protection operation that is provided between a stationary operation state of the inverter 30 (before time t3) and an all-phase ON state of the lower arm 32 (after time t3a). Namely, in the example shown in FIG. 16, the switching elements of the lower arm 32 of the inverter 30 are controlled by a PWM signal at times of ON output from the lower arm 32 of the inverter 30, that is, in the period of the time t3 to t3a in FIG. 15. By such control, it is possible to inhibit inflow of an abrupt regenerative current into the primary voltage side, that is, the capacitor 22's side, at the time of PWM all-phase OFF. Accordingly, it is possible to inhibit the occurrence of failure of the capacitor 22 or the like as a component on the primary voltage side.

(2-4) Effect

According to this embodiment, by setting the switches 82 and 92 of the short-circuiting circuits 80 and 90 at ON to form the circuit for letting the circulating current flow and setting both of the upper arm 31 and the lower arm 32 at all-phase OFF, the current flowing through the motor 2 circulates in the circulating circuit as the path including the short-circuiting circuits 80 and 90, and no current flows into the electromagnetic contactors 51 to 53. Therefore, no arc discharge occurs between the contact points of the electromagnetic contactors 51 to 53 at the time of switching the condition of the electromagnetic contactors 51 to 53 for the switching of the connection condition. Accordingly, no failure occurs in the electromagnetic contactors 51 to 53 of the connection switcher 50 even if the condition of the electromagnetic contactors 51 to 53 is switched without stopping the rotating operation of the motor.

Further, according to this embodiment, the control of setting the output voltage of the inverter 30 at zero is executed in the overmodulation region in which the motor 2 rotates at high speed, and thus the connection condition of the motor 2 can be switched without stopping the rotating operation of the motor 2.

Furthermore, according to this embodiment, the control unit 60 restarts the sensorless control in a period in which the lower arm 32 is set at all-phase ON while keeping the upper arm 31 all-phase ON and the switches 82 and 92 of the short-circuiting circuits 80 and 90 are set at OFF (e.g., after time t9 in FIG. 5), and thus the sensorless control can be executed immediately when the PWM control by the inverter 30 is restarted (e.g., time t11 in FIG. 5).

What is claimed is:

1. A motor driving device comprising:
   a connection switcher that has an electromagnetic contactor connected to a winding of a motor and switches connection condition of the winding by switching condition of the electromagnetic contactor;
   an inverter to apply an output voltage as an AC voltage to the winding via the connection switcher;
   a short-circuiting circuit having a rectification circuit and a switch; and
   a controller to control the electromagnetic contactor, the inverter and the switch, wherein
   a circulating circuit is formed by the short-circuiting circuit and the winding when the switch is set at ON, and
   the connection switcher switches the connection condition of the winding in a period in which the output voltage of the inverter is set at zero in a rotating operation of the motor and a current caused by the rotating operation circulates in the circulating circuit.

2. The motor driving device according to claim 1, wherein the inverter's operation of setting the output voltage at zero and the switching of setting the switch at ON are executed after accelerating a revolution speed of the motor to an overmodulation region of the inverter.

3. The motor driving device according to claim 1, wherein
   the inverter includes switching elements of an upper arm and switching elements of a lower arm, and
   the switching of the switch of the short-circuiting circuit from OFF to ON is executed in a switching preparation period in which the switching elements of the upper arm are set at OFF and the switching elements of the lower arm are set at ON.

4. The motor driving device according to claim 3, wherein the inverter's operation of setting the output voltage at zero is executed by setting the switching elements of the lower arm at OFF while keeping the switching elements of the upper arm OFF after a period in which the switching elements of the upper arm are set at OFF and the switching elements of the lower arm are set at ON.

5. The motor driving device according to claim 4, wherein the switching of the switch of the short-circuiting circuit from ON to OFF is executed in a period in which the switching elements of the lower arm are set at ON while keeping the switching elements of the upper arm OFF after a period in which the switching elements of the lower arm are set at OFF while keeping the switching elements of the upper arm OFF.

6. The motor driving device according to claim 5, further comprising a current detector that detects a current supplied from the inverter to the motor,
   wherein the controller restarts sensorless control in a period in which the switching elements of the lower arm are set at ON while keeping the switching elements of the upper arm OFF and the switch of the short-circuiting circuit is set at OFF.

7. The motor driving device according to claim 1, wherein
   the inverter includes switching elements of an upper arm and switching elements of a lower arm, and
   the switching of the switch of the short-circuiting circuit from OFF to ON is executed in a switching preparation period in which the switching elements of the lower arm are set at ON while keeping the switching elements of the upper arm OFF after a protection operation period in which the switching elements of the upper arm are set at OFF and PWM control is performed on the switching elements of the lower arm.

8. The motor driving device according to claim 1, further comprising a current detector that detects a current supplied from the inverter to the motor,
   wherein the controller executes sensorless control of controlling the inverter based on the current detected by the current detector.

9. The motor driving device according to claim 1, wherein the connection switcher switches the connection condition from Y connection to Δ connection or from Δ connection to Y connection.

10. The motor driving device according to claim 1, wherein the switch of the short-circuiting circuit is a semiconductor switching element.

11. An air conditioner comprising:
a motor; and
the motor driving device according to claim 1 that drives the motor.

* * * * *